Nov. 30, 1965     R. G. GIDLOW     3,220,054
AGGLOMERATING APPARATUS
Filed July 8, 1960
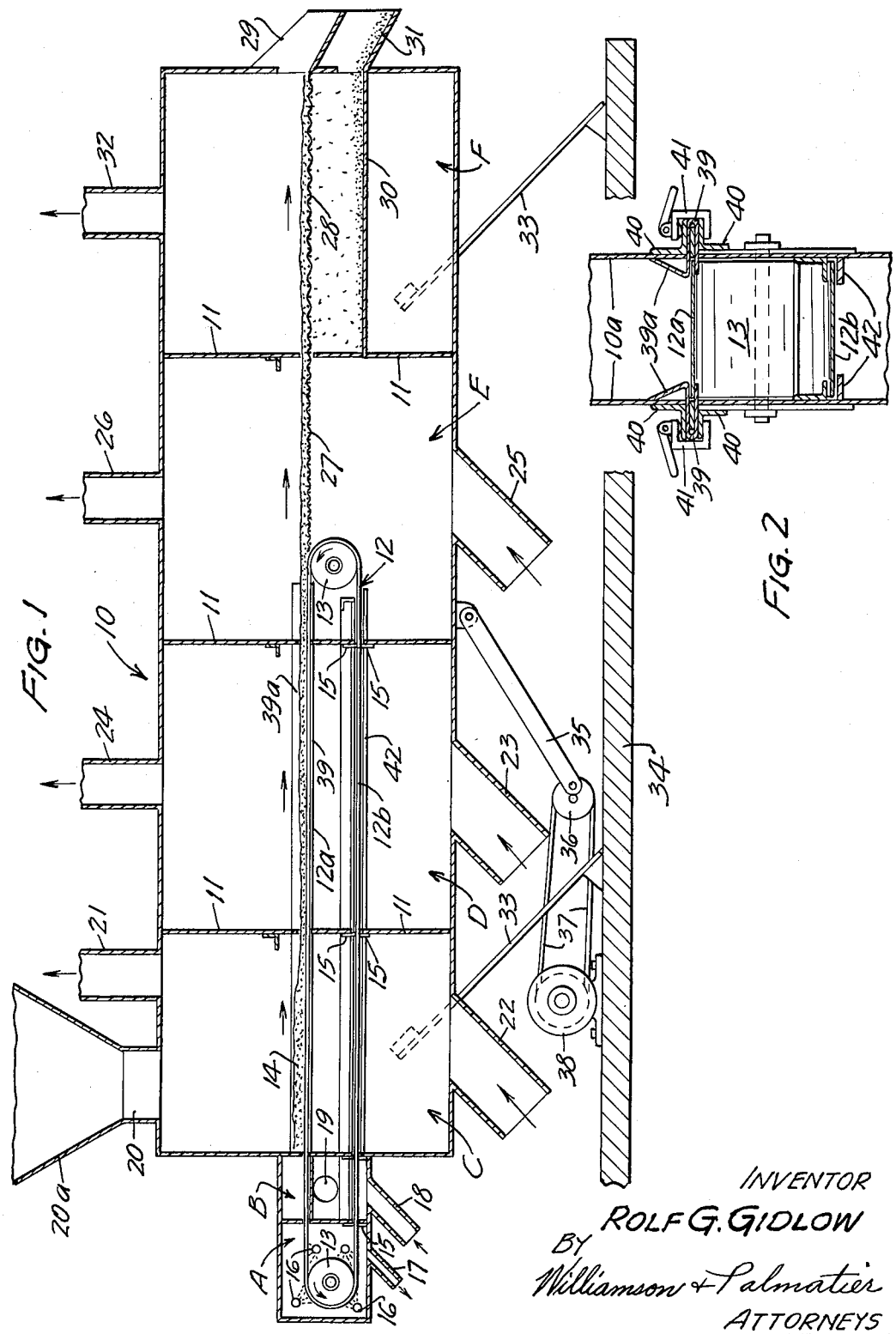

United States Patent Office 3,220,054
Patented Nov. 30, 1965

3,220,054
AGGLOMERATING APPARATUS
Rolf G. Gidlow, North St. Paul, Minn., assignor to The Pillsbury Company, Minneapolis, Minn., a corporation of Delaware
Filed July 8, 1960, Ser. No. 41,611
16 Claims. (Cl. 18—1)

This application is a continuation-in-part of application Serial No. 758,381, filed September 2, 1958, and now abandoned.

This invention relates to certain improvements, expansions and developments in an apparatus for agglomerating pulverulent materials into readily soluble or dispersible agglomerates and relates particularly to processes, machinery and apparatus for highly efficient agglomeration treatment of pulverulent materials which have relatively low melting points such as mono-hydrate dextrose, corn syrup solids and the like.

This invention relates to and constitutes an outgrowth and development in the art of agglomerating pulverulent materials in a fluidized bed utilizing many of the essential process steps set forth in a presently copending application, S.N. 758,381. The parent co-pending application referred to above briefly relates to a radically new concept of agglomerating particles by transforming the particles into a fluidized turbulent state and in such fluidized state continuously passing a super-heated vapor heated to a temperature a substantial number of degrees above the dew point thereof and passing said super-heated vapor through the continuously moving fluidized bed of pulverulent material in such fashion that the vapor loses the super-heat thereof as it passes through the lower stratum of the fluidized bed and subsequently condenses on the particles constituting the upper stratum of the fluidized bed to produce an adhesive film on the surfaces of the individual particles, a plurality of which are then united upon coming in contact with one another due to the agitation of the bed to form the desired agglomerates having a lacy network with definite voids or interstices between the original particles. Such enhanced agglomerate formation causes very rapid permeation and absorption of water or other liquids and consequently renders the product readily soluble and dispersible.

In the apparatus of the aforementioned pending application, the fluidized bed of pulverulent material to be agglomerated is continuously passed over a supporting screen or plate which is sufficiently permeable to permit the agglomerating vapors and/or gases to pass upwardly therethrough to be exhausted from the top thereof, the forward movement of the fluidized bed in one preferred form being accomplished by continuous vibration or shaking of the apparatus supporting said screen. The method and apparatus set forth in the aforementioned pending application has proven highly successful, particularly for those materials which have a relatively high melting point. However, it has been found that when the apparatus set forth in the co-pending application is utilized with low melting materials such as mono-hydrate dextrose, corn syrup solids and the like, the super-heated vapor causes melting and adhesion of that portion of the fluidized bed closely adjacent to and supported by the permeable supporting screen member, thereby causing clogging, blinding and mal-functioning of same and thereby reducing the effectiveness of the process and machine as disclosed therein when applied to such low melting particles.

Therefore, an object of my invention is agglomerating apparatus for agglomerating particles in a continuously moving substantially fluidized bed in such fashion as to prevent clogging or mal-functioning of the apparatus by the adherence of the sticky particles thereto.

More specifically, my invention relates to the employment of a continuously moving permeable screen or supporting body for the fluidized bed to be agglomerated and means for continuously cleaning said permeable screen or supporting member so that any blinding or clogging thereof will be quickly eliminated so that the fresh material continuously entering the process and apparatus be supplied with a thoroughly open permeable supporting bed or screen which is capable of permitting free passage of the agglomerating vapor or gas through the fluidized bed of material to be agglomerated.

Still another object is more advanced apparatus for agglomerating fluidized or agitated beds of pulverulent material by passing a gas or vapor through a permeable bed supporting member to form an adhesive film on the agitated particles, which advanced apparatus and methods enable low melting materials not previously capable of successful agglomeration by this general method to now be quickly and efficiently agglomerated at a high rate of production.

A still further object is to provide advanced apparatus for continuously agglomerating particulate material which involve passing a gas or vapor through a bed of said material supported on a permeable member to form a sticky surface on the particles and bonding of said sticky particles together into agglomerates and which avoid impairment of the efficiency of the continuous operation due to fouling of the permeable member by the sticky or adhesive material being agglomerated.

These and other objects and advantages of the invention will more fully appear from the following description made in connection with the accompanying drawings wherein like reference characters refer to the same or similar parts throughout the several views, and in which:

FIG. 1 is a vertical longitudinal sectional view of the apparatus of my invention; and FIG. 2 is a transverse vertical cross sectional view taken on the line 2—2 of FIG. 1.

Reference is now made to the accompanying drawings for a more detailed description of the invention. The agglomerator shown in the accompanying drawings consists of a housing or frame structure indicated generally by 10 which is divided into a series of successive compartments A, B, C, D, E and F by a plurality of suitable vertical partitioning members 11.

Sections A and B constitute screen cleaning sections while sections C, D and E comprise the material treating and agglomerating sections and section F constitutes the classifying section.

Enclosed within the housing 10 is a longitudinally disposed endless permeable planar material supporting screen or sheet 12 which is trained about suitable pulleys 13 disposed at opposite ends of the housing, one of said pulleys being provided with suitable drive means for continuously rotating said pulleys and moving said screen, said screen extending substantially the entire width of said housing 10. The top or upper section 12a of the screen 12 serves to support the pulverulent material 14 to be agglomerated and, in one of the preferred embodiments illustrated, slowly moves in a direction contrary or opposed to the overall direction of travel of the bed of material through the agglomerator. Thus, in the form shown, the pulverulent material travels from left to right or from the back to the front of the agglomerator while the screen slowly travels in an opposite direction which in the form shown is from front to back or from right to left. Opposing pairs of wiper gates 15 are mounted on the partitioning members 11 adjacent to and on opposite sides of the lower screen section 12b to seal the compartments from one another, the wiper gates 15 located in chamber A also serving to assist in wiping clean and removing excess fluid from the screen as it passes from section A into section B.

Section A constitutes the screen washing section or chamber and has mounted therein suitable nozzles 16 which are adapted to direct a spray of water against that portion of the screen passing therethrough to thoroughly clean the same and remove any of the molten, caked or sticky material clinging thereto and clogging the pores of the screen. A wash water outlet 17 is provided in the bottom of chamber A to permit the wash water to be readily drained and removed from the compartments. Although the preferred embodiment illustrated in the accompanying drawings and described herein employs a water spray as the means of cleaning the supporting screen, it is to be understood that my invention is not intended to be limited to such cleaning means only, but is intended to include within its scope any suitable means for cleaning the supporting screen, which might also include suitable brushes and the like and cleaning fluids other than water. The screen 12 may be of any suitable material which functions in the manner desired, that is, to support the bed of pulverulent material to be agglomerated and is sufficiently permeable to enable an unobstructed free flow of agglomerating vapor or gas therethrough to, in a preferred method, at least partially fluidize the bed and form an adhesive film on the particles to permit agglomeration thereof when they make contact to form readily soluble or dispersible agglomerates of said particles characterized by a lacy network of voids and interstices between the original particles which permit rapid permeation by and absorbtion of water or other liquids. A woven stainless steel dutch weave screen having a fine mesh size of 20 to 200 filaments per linear inch has proven very successful. Glass cloth or similar material having a fine mesh size of from 60 to 400 filaments per linear inch may also be successfully employed. However, it is understood that this invention is not limited to these particular screen examples, and includes within its scope any supporting medium suitable for supporting a bed of pulverulent material to be agglomerated in the manner set forth herein.

Compartment B constitutes a screen drying section which is provided with a hot air inlet port 18 and a hot air exhaust port 19. The temperature of the air entering compartment B may be of any suitable temperature which will quickly and effectively dry the portion of the screen passing therethrough. A temperature of approximately 250 degrees F. has been found to be very satisfactory.

Section C constitutes the agglomerating section or chamber. The pulverulent material to be agglomerated is fed into this section through a charging opening 20 having a suitable feed hopper 20a in the top of the section which communicates with any suitable source of unagglomerated pulverulent material. The roof or upper portion of the agglomerating section C is also provided with an exhaust opening 21 for removing the agglomerating vapors or gases therefrom. The bottom or lower portion of the chamber C is provided with an inlet port 22 for feeding the gasiform agglomerating vapor or gas into the chamber C, the agglomerating vapor or gas thereby passing upwardly through the screen 12a and bed of pulverulent material 14 supported atop the screen section 12a to form an adhesive film on the pulverulent particles to effect agglomeration thereof, the bed of pulverulent material maintaining a substantially uniform cross-sectional area.

The gasiform agglomerating medium for forming the adhesive films on the particles may consist of a vapor which is either condensable or absorbable on the surfaces of the particles within the range of temperatures employed and which, when condensed or absorbed upon the surface of the particles will adhere them together. These condensable vapors may be heated to a temperature slightly above the dew point thereof so that condensation will be effected almost simultaneously upon the vapor making contact with the particles, or the vapor may be super-heated as disclosed in the aforementioned co-pending application to delay the condensation to the upper stratum of the fluidized bed being agglomerated. This vapor may be admixed with an inert carrier gas which is not condensable within the range of temperatures employed and which is inert towards the material being treated. In certain circumstances, the agglomeration can be accomplished without condensation or absorbtion of a substance on the particles to provide an adhesive surface, such for example as in those circumstances where a sticky surface may be provided on the particles by temperature alone, to effect incipient fusion of the particle surfaces and thereby render them sticky or adhesive. In such circumstances, the gas may be inert towards the material being treated and heated to a temperature which will effect such incipient melting or fusion of the particles.

For convenience, the gasiform agglomerating medium may be referred to throughout this disclosure as vapor gas. The adhesive films may be formed by a solvent reaction between the particle surface and the vapor gas to convert the particle surface into a sticky layer adhesive in nature, or the vapor gas may simply deposit a layer of adhesive film on the particle surface or may simply effect incipient fusion by heat alone. In any event, the vapor gas employed must be capable of effecting an adhesive film on the particles which will cause the particles to adhere together and agglomerate when brought into contact with one another by the turbulent nature of the bed of material. Thus, the vapor gas employed may be heated above the dew point to provide subsequent condensation on the particles or they may be solvent gases which actually dissolve a portion of the particle surface to render it sticky and adhesive or hot inert gases which melt the surface of the particles and thereby render them adhesive in character.

The turbulence of the bed of particulate material is preferably effected primarily by the flow of the vapor gas therethrough, the rate of flow of such vapor gas being controlled to provide in effect a fluidized bed of pulverulent material, which turbulence and agitation of particles enables the vapor gas to more readily contact all of the particles and bring the adhesive particles into contact with one another to effect agglomeration thereof. This tuburlence and agitation may optionally be augmented by the continuous shaking or vibrating of the screen and housing hereinafter to be described.

Section D constitutes the material drying section, which section is provided with an inlet port in the bottom thereof indicated by 23 for feeding a drying gas such as warm air into chamber D and upwardly through the screen 12a and bed of sticky agglomerates to dry and rigidify the agglomerates formed in section C. The upper portion of the chamber D above the screen 12a is provided with an exhaust port 24 to permit continuous elimination of the drying gas after it has passed through the bed of agglomerated material lying on the screen 12a. The drying gas dries the adhesive films of the agglomerates previously formed and rigidifies and solidifies the same to enable them to maintain their shape and structure during subsequent handling and to prevent their sticking or adhering to things during said subsequent handling.

Section E constitutes the cooling section and is provided with suitable inlet and outlet ports 25 and 26 respectively for circulating a cooling gas such as air through the dried agglomerated material to cool the same to approximately room temperature. The cooling section is also provided with a stationary screen 27 similar to screen 12, which screen serves to support the moving bed of dried agglomerates and permits the cooling gas passing upwardly through the chamber to pass through the screen 27 and bed to thoroughly cool same. It will be recognized that in some instances it may be desirable to extend the traveling supporting screen through the cooling section also if the material delivered thereto is still somewhat sticky, such as when the agglomeration is effected by a heated gas and resultant incipient fusion and the cooling is primarily responsible for eliminating the stickiness and rigidifying the agglomerates.

Section F constitutes a classifying section or chamber having a classifying screen 28 of coarser mesh than screens 12 and 27 and adapted to separate the undersized agglomerates and any unagglomerated material from those agglomerates having the desired minimum size. The suitably sized agglomerates are discharged from the screen 28 through a suitable discharge spout 29. The undersized agglomerates and unagglomerated particles are collected on a plate 30 and discharged therefrom through a suitable discharge spout 31. The chamber or section F is also provided with a discharge port or stack 32 to remove any dust produced in the screening or classifying operation. In some instances, it may be desirable to provide additional classifying screens to effect additional classification such as into oversize product and undersize.

The gases employed in each of the chambers or sections are preferably maintained distinct from one another as they are discharged from their respective chambers to enable the gases to be totally or partially reused and recirculated to effect economy of operation, the exhausted gas being exhausted and channeled through suitable dust collectors (not shown).

To aid in agitating the pulverulent material and to keep the individual particles and agglomerates in continually substantially fluidized condition and to move the material continuously forwardly through the agglomerator when the screen 12 is moving in a direction opposite to the direction of travel of the bed of material as in FIG. 1, and to aid in reducing fouling of the screen, the frame or housing 10 may be supported by suitable rocker arms 33 which are hingedly connected to the housing 10 and a fixed supporting base 34 to enable the housing 10 to rock back and forth to vibrate the same and provide forward motion to impell the bed of pulverulent material forwardly. The actual vibratory motion is provided by a reciprocating arm or Pitman 35 connected to an eccentric wheel 36 which is driven by means of a drive belt 37 drivingly connected to a suitable source of power or motor 38 which combine to agitate and substantially fluidize the particles and agglomerates and move them steadily forwardly by the rapid, short stroke vibration effected thereby. Thus, the material is moved successively and progressively through the chambers C, D, E and F where it is converted from particulate to agglomerated form.

Although the vibrating mechanism has been illustrated and described herein as one successful means of moving or transporting the material through the agglomerating apparatus, it will be readily appreciated by those skilled in the art that other means may be employed to transport or motivate the material through the apparatus. It will also be appreciated that in another form of my invention the moving screen supporting the material may travel in the same direction as the bed of material and serve as the means for transporting the material through the apparatus without help from any additional means such as the vibrating mechanism, with the agitation of the bed being provided solely by the action of the upward moving stream of gas, or the moving screen moving in the same direction as the bed of material may be used simultaneously with the vibrating mechanism. It can thus be seen that the apparatus of this invention provides for flexibility of operation to permit operational conditions to be adjusted to the particular material being agglomerated and other factors. It will further be appreciated that the vibrating mechanism hereinbefore described as applied to the preferred form of the invention illustrated is intended to function primarily as a means for moving the material through the agglomerator, and the fluidization and agitation of the particles may be successfully accomplished completely by other means, although the vibration certainly assists in maintaining the material in that condition, and in some forms of the invention may constitute the primary means for fluidizing the bed of material.

Suitable guide members 39 are provided along the sides of the housing 10 to provide a continuous supporting and guiding surface for the upper screen 12a. The screen guides are removably held in place by opposing pairs of angle members 40 which are removably clamped against the screen guides to hold the same in place by suitable clamps 41. The upper portion 10a of the housing is preferably removably mounted to enable the upper half to be removed for convenience in cleaning and repairing the interior of the agglomerator. In the form shown, the side walls of the upper portion 10a are removably held in place between the upper-most of the angles 40 and the inclined portion 39a of the screen guides 39. Suitably slotted guide members 42 serve to guide the lower screen portion 12b.

In the practice of one preferred method of this invention with the apparatus shown in the accompanying drawings, the pulverulent material to be agglomerated is continuously fed into the agglomerating chamber C through the charging opening 20 onto the slowly moving screen 12a which slowly moves rearwardly in direct opposition to the general flow of the pulverulent material through the agglomerator. As the puverulent material is fed onto the screen section 12a, an agglomerating gas or vapor is fed into the chamber C through the inlet port 22 and forced upwardly through the chamber and through the bed of pulverulent material supported by the screen 12a, the agglomerating vapor-gas traveling at a rate of speed sufficient to agitate and at least partially fluidized the bed of pulverulent material to cause turbulence therein and frequent and repeated contact of the particles to cause the same to agglomerate after an adhesive film has been formed on the outer surface of said particles by the agglomerating vapor gas to which they are exposed. The agglomerating gas may consist of vaporized humid air and an inert carrier gas or a solvent gas capable of partially dissolving the periphery of the particles to render the same adhesive and sticky or simply a heated inert gas as previously hereinbefore described. In any event, the agglomerating gas causes a sticky film to form on the peripheral surface of the particles and the turbulence effected by the force of the agglomerating gas or vapor causes the sticky particles to repeatedly contact and adhere to one another to form the larger agglomerates desired. The fluidized bed of pulverulent material is continuously moved forwardly against the rearward motion of the endless screen 12 at a rate of speed sufficient to counteract the drag caused thereon by the counter motion of the screen and at a rate which will enable the particles to remain in section C a sufficient length of time to cause agglomeration of substantially the entire amount of pulverulent material charged to chamber C so that the fluidized bed upon leaving chamber C and entering the drying chamber D is substantially entirely agglomerated.

When the sticky or adhesive film on the particles is to be formed thereon by incipient fusion effected by treating the particles with heated inert gas, it may be preferable to reverse the direction of flow of the agglomerating gas and pass the heated gas stream downwardly through the bed of particulate material, relying on the mechanical agitation of the bed to maintain it in a fluidized state and maintaining the velocity of the downwardly directed gas stream below that which would neutralize the mechanical agitation and compact the bed. By reversing the direction of flow of the heated agglomerating gas, the temperature gradient of the bed of particulate material decreases from the top of the bottom thereof, with the hottest and stickiest particles being located in the upper strata of the bed and the coolest and least sticky particles being found in lower strata of the bed, thereby serving to reduce the rate and degree of fouling of the permeable screen supporting the bed.

Although the speed of the screen 12a and the rate of travel of the product may vary according to particular circumstances, we have found that a rate of travel of approximately 1 foot per minute for the screen and a rate of about 30 feet per minute for the product bed produces very satisfactory results. After the agglomeration has been completed, the sticky agglomerated material passes from chamber C into the drying section or chamber D where the bed of agglomerated material is subjected to a drying action by a flow of warm air which is continuously passing therethrough. This drying action serves to not only remove the stickiness from the agglomerates and the moisture which may have been added thereto, but also serves to rigidify the aglomerates to prevent and inhibit subsequent disintegration thereof during subsequent handling, storage and transportation thereof. The dried, firmed agglomerates then pass from the drying section D into the cooling section E where they are subjected to a continuous flow of air to cool the same to approximately room temperature. As the dried agglomerates pass from section D to section E, the agglomerates are transferred from the screen 12 to the screen 27 where the agglomerates are agitated and cooled by the cooling gas or air passing through the screen 27 and bed of dried agglomerates. When the agglomeration is effected by incipient fusion, the drying section in most instances may be eliminated, with the agglomerates being cooled immediately after leaving the agglomeration section to firm and rigidify them. The cooled agglomerates then pass from section E to classifying section F where they are classified by the screen 28 into proper sized finished product agglomerates which are discharged through spout 29, and undersized agglomerates and unagglomerated particles which pass through screen 28 and are collected on plate 30 for discharge through spout 31.

The portion of the screen 12a continuously passing through the agglomerating section C and drying section D is continuously subjected to and comes in contact with the sticky adhesive agglomerates supported thereon which tend to cause the screen 12a to become clogged with the sticky agglomerates which tend to adhere thereto. If the screen were stationary, it is obvious that the pores of the screen 12 would rapidly become clogged to a point and degree where it would become virtually impossible for the agglomerating gas to pass therethrough to fluidize the pulverulent material and cause the formation of an adhesive film thereon unless super-heated vapor gas were employed as taught in the aforementioned co-pending application. Therefore, I have provided for a moving bed supporting member or screen as previously described above, contaminated portions of which are continuously removed from the agglomerating section C and sent to the screen cleaning sections A and B. Thus, the contaminated clogged screen passes directly from the agglomerating section C into the screen washing section A where it is subjected to a cleaning operation provided by the water or other cleaning fluid spraying from the nozzles 16 located in section A. The screen passes around the pulley 13 and after having been suitably cleaned moves from the washing section A into the drying section B where it is continuously subjected to a flow of hot air which thoroughly dries the screen before entering the agglomerating section C. The wiper gates 15 located in chamber A are resilient in nature and continuously bear against both sides of the screen 12b passing therebetween and function as squeegees as well as sealing members to wipe a considerable portion of the water or other cleaning fluid therefrom as the screen passes therebetween to remove as much of the excess cleaning fluid therefrom as possible and make easier the drying of the screens in section B. The gates 15 located in the other sections aid in sealing the adjacent sections from one another to prevent the inter-mixture of gases therebetween. The cleaning fluids may optionally be treated to recover the material removed from the screen during cleaning thereof.

Although the preferred practice and methods of this invention include maintaining the bed of particulate material to be agglomerated in an agitated substantially fluidized state, it will be appreciated that the apparatus of this invention incorporating a moving bed supporting member such as a permeable screen and means for cleaning same enable agglomeration to take place with the bed of material in a more quiescent state. The agglomerated material thus formed may develop into a cake on the moving screen which may be subsequently crushed and sized by auxiliary equipment.

From the foregoing description and accompanying drawings, the advantages and extent of advancement in the development of apparatus and methods for agglomerating pulverulent material as set forth may be readily understood and appreciated. The apparatus and methods set forth in the co-pending application S.N. 758,381 represent the most advanced and successful means of agglomerating pulverulent material yet known. However, since this co-pending method requires the use of super-heated vapor gas, it functions most efficiently only with materials having melting points above that of the vapor gas temperature used. However, with materials having a melting point below this temperature, the pervious supporting screen rapidly becomes fouled and materially interferes with further agglomeration. Thus, the method of the co-pending application is limited to super-heated vapors used with materials having a higher melting point than the super-heated temperature of the vapor gas. However, the instant invention employing the moving supporting screen and the means for cleaning the contaminated portions thereof and continuously returning them to the processing areas obviates the need for super-heated vapor gas, thereby reducing the costs of operation and enabling pulverulent materials having considerably lower melting points than those previously capable of agglomeration by this method to be successfully agglomerated, while still satisfactorily agglomerating those higher melting materials previously agglomerated by the super-heated vapor gases while maintaining a sufficiently clean supporting screen in the processing area at all times.

Examples of materials which may be successfully agglomerated by the methods and apparatus disclosed herein which cannot be successfully agglomerated by the method of the aforementioned co-pending application due to the low melting points of the materials and the super-heated agglomerating vapors employed are corn sugar dextrose mono-hydrate, which begins to melt at about 160 degrees F., and citric acid mono-hydrate which begins to soften and melt at about 158 degrees F., the melting points of these compounds being considerably lower than the temperature of the super-heated vapor normally employed in the method and apparatus of the co-pending application.

It will, of course, be understood that various changes may be made in the form, details, arrangement and proportions of the various parts without departing from the scope of my invention.

What I claim is:

1. Apparatus for agglomerating pulverulent material which includes permeable means for supporting a bed of pulverulent material thereon, means for passing an agglomerating gasiform medium through said permeable means and said bed to form an adhesive film on the particles thereof, means for agitating said bed to effect formation of agglomerates, means for continuously removing at least a portion of said permeable means from engagement with said particulate bed and simultaneously replacing said removed portion with a cleaner portion, and means for cleaning said removed portion and returning same to the agglomerating operation.

2. Apparatus for agglomerating pulverulent material which includes structure providing an agglomerating chamber, pervious supporting means disposed in said chamber for supporting a bed of pulverulent material thereon, means for flowing an agglomerating medium through said supporting means to form an adhesive film on the particles forming said bed, means for agitating said bed to effect agglomeration of the particles treated with said medium, means for continuously moving said supporting means through and out of said chamber while maintaining a constant area of pervious supporting surface therein, and means for cleaning that portion of the supporting means removed from said chamber and returning the cleaned portion thereto.

3. Apparatus for agglomerating pulverulent material which includes structure providing an agglomerating chamber, an endless pervious supporting means disposed in said chamber for supporting a bed of pulverulent material thereon, means for flowing an agglomerating medium through said supporting means to form an adhesive film on the particles forming said bed, means for agitating said bed to effect agglomeration of the particles, means for continuously moving said supporting means through said chamber to continuously remove the material contaminated portions thereof and replacing the same with cleaner portions of said supporting means while maintaining a constant area of pervious supporting surface therein, means for cleaning the contaminated portion of the supporting means removed from said chamber, and means for continuously removing the agglomerates from said chamber.

4. The apparatus set forth in cliam 3 and means independent of said pervious supporting means for effecting movement of said bed of pulverulent material in a predetermined direction of travel generally parallel to the supporting surface provided by said pervious supporting means.

5. The structure set forth in claim 4 including means for vibrating said structure to provide movement of said bed through a predetermined course of travel generally paralleling the supporting surface provided by said pervious supporting means.

6. Apparatus for agglomerating pulverulent material comprising structure providing an agglomerating chamber, an endless permeable supporting medium adapted to continuously move through and out of said chamber in one direction while supporting a bed of pulverulent material thereatop, means for flowing an agglomerating medium through said supporting medium to form an adhesive film on the particles forming said bed, means for agitating the particles so treated to form agglomerates, means for shaking said supporting medium to effect general movement of said bed of pulverulent material in a direction of travel generally opposite to that of the supporting medium, and means for cleaning said supporting medium intermediate its removal from the agglomerating chamber and its return thereto.

7. Apparatus for agglomerating pulverulent material comprising structure forming a series of successive chambers including an agglomerating chamber, a drying chamber and a cleaning chamber, an endless permeable supporting medium disposed generally horizontally and adapted to move continuously through said successive chambers in one direction while supporting a bed of pulverulent material thereatop in said agglomerating and drying chambers, means for flowing a vapor gas through said supporting medium in said agglomerating chamber to form an adhesive film on the particles forming the bed of material located therein, means for agitating said gas treated particles to form agglomerates, means for shaking said supporting medium to effect general movement of said bed of pulverulent material in a direction of travel generally opposite to that of the supporting medium and effecting continuous removal of the agglomerates from the agglomerating chamber to the drying chamber, means for treating the agglomerates in said drying section to remove the adhesiveness from said particles and rigidify the agglomerates, and means for cleaning said supporting medium in the cleaning chamber to insure that a clean permeable supporting medium is continuously delivered to the drying and agglomerating chambers.

8. Apparatus for agglomerating pulverulent material which includes permeable means for supporting a bed of pulverulent material thereon, means for passing an agglomerating gasiform medium through said permeable means and said bed to form an adhesive film on the particles thereof, means for continuously removing at least a portion of said permeable means for engagement with said particulate bed and simultaneously replacing said removed portion with a cleaner portion, and means for cleaning said removed portion and returning same to the agglomerating operation.

9. Apparatus for agglomerating pulveruent material comprising material supporting means, means for forming a bed of pulverulent material on said supporting means, means for agitating and dispersing the particles comprising said bed, and means for heating said dispersed agitated particles to cause incipient melting of their surfaces to form adhesive surfaces thereon and agglomeration therof.

10. Apparatus for agglomerating pulverulent material comprising endless permeable means for supporting a bed of pulverulent material, means for flowing an agglomerating medium capable of forming adhesive surfaces on said particles through said bed and permeable to thereby cause agglomeration of said material, and means for moving said permeable means during the agglomeration of said material whereby the bed supporting portion of said permeable means is changed while the total bed supporting surface remains constant.

11. Apparatus for agglomerating pulverulent material comprising permeable supporting means capable of supporting a bed of pulverulent material thereon, means for agitating and dispersing said bed of particles, means for treating said dispsersed agitated particles to form adhesive surfaces thereon and cause agglomeration thereof, and means for continuously removing at least a portion of said permeable means from supporting engagement with said particulate bed and simultaneously replacing said removed portion with a clearer portion, and means for cleaning said removed portion and returning same to the agglomerating operation.

12. Apparatus for agglomerating pulverulent material comprising permeable supporting means capable of supporting a bed of pulverulent material theron, means for flowing an agglomerating medium through said permeable supporting means and said bed of material to thereby cause the formation of adhesive surfaces on said particles and the agglomeration thereof, said permeable supporting means being of such size as to always have a portion thereof underlying and supporting said bed of material and a second portion comprising a continuation of said first portion out of engagement with said bed of material, and means for moving said permeable supporting means relative to said bed supported thereon whereby successive portions thereof are repeatedly moved into and out of supporting engagement with said bed, and means for cleaning the portions of permeable supporting means when out of supporting engagment with said bed whereby dirty portions of the supporting means are repeatedly replaced by cleaned portions.

13. The apparatus set forth in claim 12 wherein the adhesive forming means are heated to a temperature capable of causing incipient fusion of the particle surfaces.

14. Apparatus for agglomerating pulverulent material which comprises permeable supporting means capable of supporting a bed of pulverulent material thereon, means for flowing an agglomerating medium through said permeable supporting means and said bed of material to form adhesive surfaces on the particles comprising said bed and cause agglomeration thereof, and means for moving said permeable supporting means so as to continuously remove and replace portions of the permeable supporting means from supporting engagement with said bed and then successively return said removed portions to supporting engagement with said bed, and means for cleaning the permeable supporting means while it is out of supporting engagement with said bed.

15. In material treating apparatus, permeable supporting means capable of supporting pulverulent material thereon, means for moving said supporting means relative to said material so as to repeatedly remove successive portions of said supporting means from beneath said material and recycle them back to supporting engagement therewith, and means for cleaning the non-supporting portions of said supporting means prior to their being returned beneath said material.

16. In material treating apparatus, endless permeable supporting means capable of supporting pulverulent material on only a portion thereof at any given time, means for moving said supporting means relative to said material so as to substantially continuously remove successive portions of said supporting means from beneath said material and recycle them back to supporting engagement therewith, and means for cleaning those portions of the supporting means which have been removed from beneath said material and are being returned thereto.

References Cited by the Examiner

UNITED STATES PATENTS

| | | | |
|---|---|---|---|
| 1,852,418 | 4/1932 | Koch | 99—27 |
| 2,553,467 | 5/1951 | Neef | 99—27 |
| 2,834,044 | 5/1958 | Antonsen et al. | 18—1 |
| 2,861,294 | 11/1958 | Glaxner et al. | 18—1 |
| 2,995,773 | 8/1961 | Gidlow et al. | 18—1 |

WILLIAM J. STEPHENSON, *Primary Examiner.*

MICHAEL V. BRINDISI, NEDWIN BERGER,
*Examiners.*